United States Patent [19]
Jun et al.

[11] Patent Number: 5,844,641
[45] Date of Patent: Dec. 1, 1998

[54] LIQUID CRYSTAL DISPLAY DEVICE HAVING STORAGE CAPACITORS AND ADDITIONAL OPAQUE ELECTRODES

[75] Inventors: Jung-Mok Jun, Seoul; Seok-Lyul Lee, Kyoungki-do, both of Rep. of Korea

[73] Assignee: Hyundai Electronics Industries Co., Ltd., Kyoungki-do, Rep. of Korea

[21] Appl. No.: 953,859

[22] Filed: Oct. 16, 1997

[30] Foreign Application Priority Data

Oct. 16, 1996 [KR] Rep. of Korea .................. 1996-46300

[51] Int. Cl.⁶ ........................ G02F 1/1343; G02F 1/1333
[52] U.S. Cl. ................................ 349/38; 349/39; 349/111
[58] Field of Search ................................ 349/38, 39, 111

[56] References Cited

U.S. PATENT DOCUMENTS

| | | | |
|---|---|---|---|
| 4,955,697 | 9/1990 | Tsukada et al. ........................... | 349/38 |
| 5,426,523 | 6/1995 | Shimada et al. ......................... | 349/111 |
| 5,517,341 | 5/1996 | Kim et al. ................................. | 359/59 |
| 5,517,342 | 5/1996 | Kim et al. ................................. | 359/59 |
| 5,528,395 | 6/1996 | So ............................................. | 359/59 |
| 5,659,375 | 8/1997 | Yamashita et al. ...................... | 349/111 |
| 5,691,786 | 11/1997 | Nakai ....................................... | 349/39 |
| 5,760,854 | 6/1998 | Ono et al. ................................. | 349/39 |

*Primary Examiner*—William L. Sikes
*Assistant Examiner*—Tiep H. Nguyen
*Attorney, Agent, or Firm*—Ware, Fressola, Van Der Sluys & Adolphson LLP

[57] ABSTRACT

Disclosed is a liquid crystal display device having opaque electrodes at both edge portions of a pixel electrode. The LCD device includes a plurality of gate signal lines, each having a plurality of projected portions; a plurality of data signal lines, being perpendicular to the length direction of the gate signal line; a plurality of thin film transistors corresponding respectively to unit pixel region; a plurality of pixel electrodes formed on the insulating layer within respective unit pixel regions, being overlapped with the projected portion of the adjacent gate signal; and a plurality of opaque electrodes formed below said insulating layer, being arranged parallel to the data signal lines, each extending from both edge portions of each pixel electrode parallel to the data lines to selected positions between said each pixel electrode and both data lines adjacent thereto, each electrically connected with said each pixel electrode through a contact plug formed in said insulating layer.

10 Claims, 4 Drawing Sheets

LIQUID CRYSTAL DISPLAY DEVICE HAVING STORAGE CAPACITORS AND ADDITIONAL OPAQUE ELECTRODES

BACKGROUND OF THE INVENTION

1. Field of the Invention

The present invention generally relates to a liquid crystal display device, and more particularly to a liquid crystal display device having a storage capacitor.

2. Description of the Related Art

Recently, a liquid crystal display (LCD) device has been widely used in display devices such as televisions, computer monitors, and similar graphic displays. The LCD device is divided into various types according to its operational method, type of liquid crystal used, or other used components. Among these LCD devices, research and developememt have been focused on active matrix liquid crystal display devices, since these types of devices are anticipated to be capable of achieving fast response time, high picture quality, larger screen size, and color display.

Generally, active matrix LCD device includes a first transparent substrate formed with thin film transistors and pixel electrodes, and a second transparent substrate formed with color filters, and a counter(or common) electrode. A liquid crystal is filled in a space defined between the first transparent substrate and the second transparent one. Polarizing plates for linearly polarizing visible rays are selectively attached to opposed surfaces of the transparent substrates, respectively.

In U.S. Pat. No. 5,528,395 issued on Jun. 18, 1996, Hoe S. So discloses a thin film transistor(TFT) LCD device having reference electrodes for storage capacitor, each formed to be overlapped with adjacent transparent pixel electrode.

A structure of an unit pixel in TFT-LCD proposed by Hoe S. So will be described with reference to the accompanying drawing of FIG. 1. The unit pixel region is defined as a region bounded by two adjacent, parallel gate(or scanning) signal lines and two adjacent, parallel data(or display) lines. FIG. 1 is a plan view schematically showing the unit pixel and portions adjacent thereto.

Referring to FIG. 1, the unit pixel region of a TFT-LCD device includes two gate signal lines 1, 1a where a driving signal for each unit pixel is applied, each arranged between two neighboring pixel regions in one direction, two data lines 2, 2a where an image signal for each unit pixel is applied, each arranged between two neighboring pixel regions in a direction perpendicular to the direction of the gate signal lines, a transparent pixel electrode 4 positioned at the unit pixel region defined by two gate signal lines 1, 1a and two data lines 2, 2a, and a thin film transistor 3 for switching the transparent electrode 4. The thin film transistor 3 has a gate electrode connected with one corresponding gate signal line 1, a source electrode connected with one corresponding data line 2, a drain electrode connected with the transparent pixel electrode 4. There are also provided three storage capacitors to maintain a signal state during a selected time when a signal of "high" or "low" signal state is given. In the present prior art, to form a first storage capacitor 6, the transparent pixel electrode 4 is overlapped with the gate signal line 1a adjacent thereto by a selected region. There is also provided a diode 7 to apply a driving signal to a reference electrode 8, one terminal of which is forwardly connected to the front gate signal line 1a and the other terminal of the diode 7 is connected to the reference electrodes 8.

The referenc electrode 8 (or 8a) is comprised of an opaque electrode adapted to shield a reverse tilt region where liquid crystal moleculars are tilt reversely with an alignment direction of the liquid crystal moleculars when the electric field is applied, the phenomenon being caused by the coupling between the pixel electrode and a data signal line adjacent thereto. Each reference electrode 8 or 8a has a H-shape including a pair of wings to be symmetrically arranged with respect to each corresponding data signal line 2 or 2a. The wings of the reference electrodes 8 and 8a within the unit pixel region are overlapped with both edge portions of the transparent pixel electrode 4 adjacent thereto. By such an overlap of the reference electrode 8 with the transparent pixel electrode 4, a second storage capacitor 6a and a third storage capacitor 6b are formed.

The above TFT-LCD device has the following effects: first, an improvement in yield is achieved because a plurality of storage capacitors(three storage capacitors) are provided at each pixel region so that even though a failure occurs in one of the storage capacitors due to pin holes, a normal operation can be performed by the remaining storage capacitors; and second, the black matrix design tolerance can be reduced because the reference elctrodes provided at the reverse tilt regions serve to shield leakage light.

However, even though these effects are provided, the device needs one diode per unit pixel region, which requres a space by about 10% with respect to the aperture, resulting in the decrease in the aperture ratio.

Moreover, the device has drawbacks that voltage of the reference electrode may be decreased according to electrical and physical properties of the provided diode and that fabrication yield is decreased because of additive processes for the formation of the diode.

SUMMARY OF THE INVENTION

Accordingly, the present invention is provided for the purpose of resolving the above-mentioned problems, and it is an object of the present invention to provide a liquid crystal display device capable of enhancing an aperture ratio of a LCD device while preventing drop in display quality due to leakage current and reverse tilt phenomenon caused by a horizontal electric field generated between a pixel electrode and a data signal line adjacent thereto.

In accordance with one aspect of the present invention, there is provided a liquid crystal display device having opaque electrodes at both edge portions of a pixel electrode. The device includes a plurality of gate signal lines arranged in a direction on a transparent insulating substrate. The gate signal lines are parallel to each other, spaced by a selected distance from each other. Each of the gate signal lines has a plurality of projected portions perpendicular to the lenth direction of the gate signal lines. The gate signal lines are perpendicular to a plurality of data signal lines. A plurality of unit pixel regions are defined by the intersection of the gate signal lines with the data signal lines. The device also includes a plurality of pixel electrodes overlapped with the projected portion of the adjacent gate signal; and a plurality of opaque electrodes arranged parallel to the data signal lines. Each of the opaque electrodes extends from both edge portions of each pixel electrode parallel to the data lines to selected positions between each pixel electrode and both data lines adjacent thereto and is electrically connected with each pixel electrode through a contact plug formed in an insulating layer interposed between the the pixel electrodes and the opaque electrodes.

In accordance with another aspect of the present invention, there is provided a liquid crystal display device.

The device including a plurality of gate signal lines and a plurality of data signal lines arranged on a matrix configuration. A plurality of unit pixel regions are defined by the intersection of the gate signal lines with the data signal lines. A plurality of thin film transistors corresponds respectively to the unit pixel regions. The device also includes a plurality of pixel electrodes, and a plurality of opaque electrodes arranged parallel to the data signal lines. Each of the opaque electrodes extends from both edge portions of each pixel electrode parallel to the data lines to selected positions between said each pixel electrode and both data lines adjacent thereto and is electrically connected with said each pixel electrode through a contact plug formed in an insulating layer disposed between the opaque electrode and the pixel electrode. A plurality of storage electrode lines are formed on said insulating layer. Each of the storage electrode lines is arranged parallel to the gate signal lines between each pixel electrode and any one of a pair of gate signal lines adjacent to said each pixel electrode, and has a plurality of projected portions projected inwardly with respect to respective corresponding pixel electrodes such that the projected portions is overlapped with respective corresponding pixel electrodes.

BRIEF DESCRIPTION OF THE DRAWINGS

These and other objects, features and advantages of the present invention will become more apparent in light of the detailed description of a best mode embodiment thereof, as illustrated in the accompanying drawing, wherein.

DETAILED DESCRIPTION OF THE INVENTION

Hereinbelow, with reference to the accompanying drawings, preferred embodiments of the present invention will be described.

Figure 1:
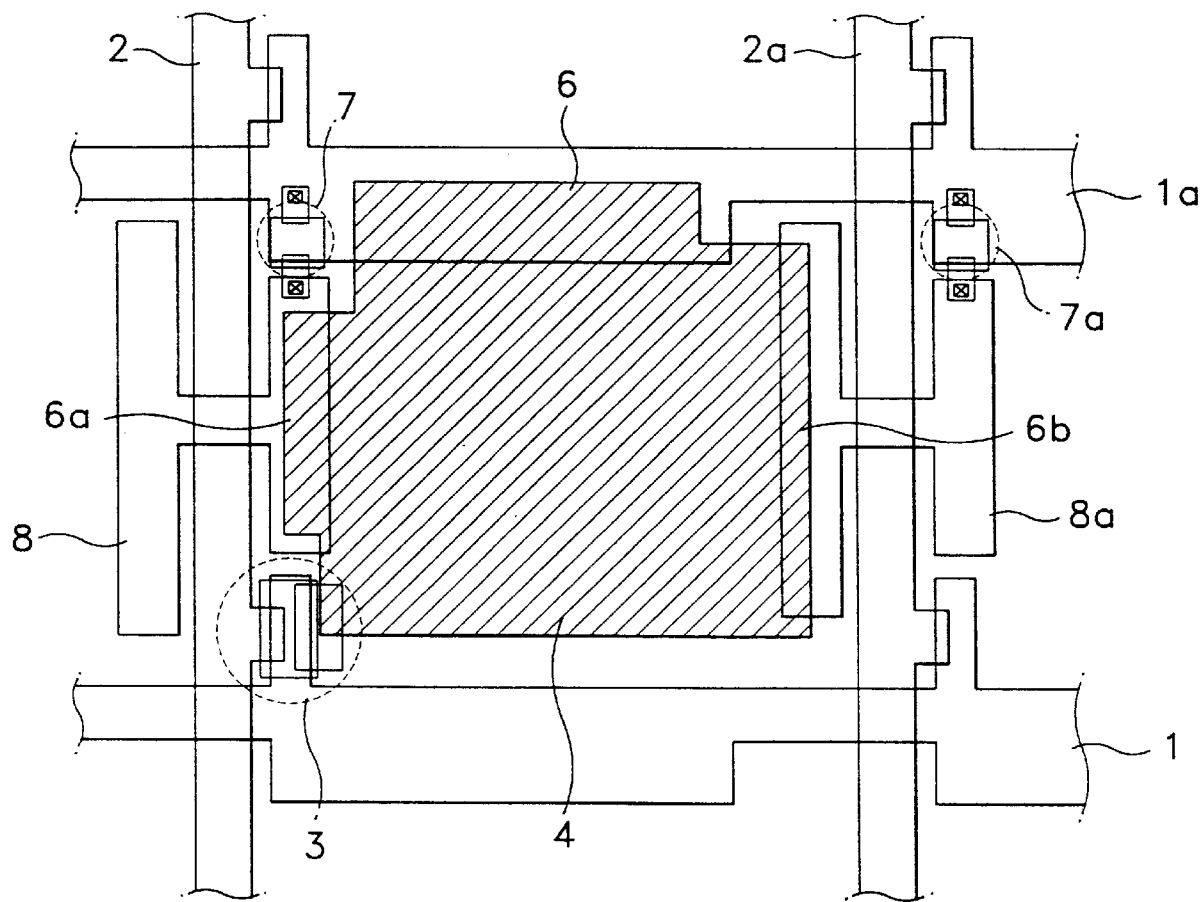
FIG. 1 is a plan view showing a unit pixel region of a TFT-LCD device in accordance with the prior art.
Figure 2:
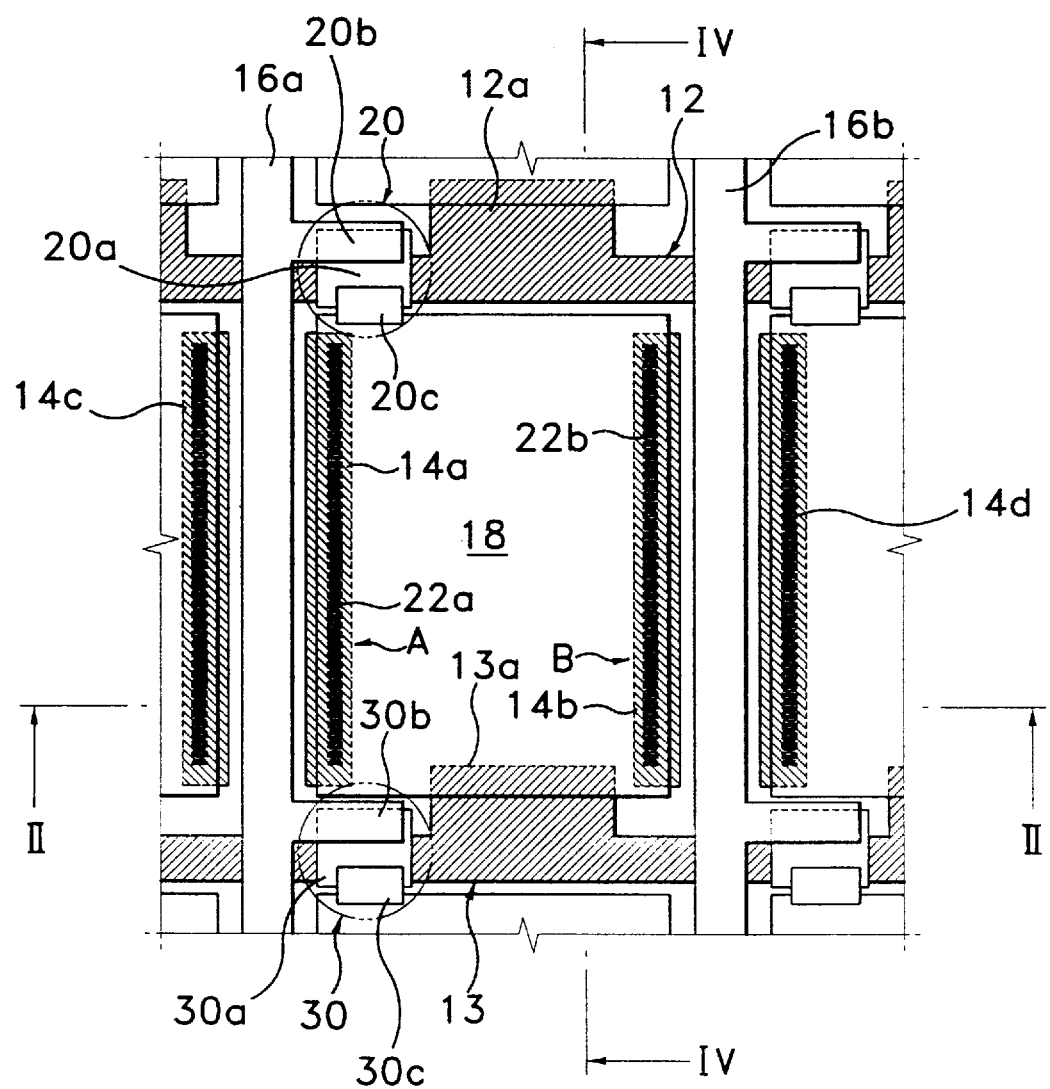
FIG. 2 is a plan view showing a unit pixel region of a TFT-LCD device in accordance with one embodiment of the present invention.

FIG. 2 is a plan view showing a unit pixel region of a TFT-LCD device in accordance with one embodiment of the present invention.

Referring to FIG. 2, two gate signal lines 12 and 13 are provided on a transparent insulating substrate in order to apply driving signals to respective corresponding gate electrodes of respective corresponding thin film transistors, wherein a first gate signal line 12 corresponds to a first thin film transistor 20 and a second gate signal line 13 corresponds to a second thin film transistor 30. Each of the gate signal lines is arranged between neighboring pixel regions in one direction, and has a plurality of projected portions outwardly to respective pixel electrodes of respective corresponding unit pixel regions. Here, the second gate signal line 13 corresponds to the transparent pixel electrode 18. Two data signal lines 16a and 16b are provided for applying image signals to respective corresponding pixel electrodes via respective drain electrodes of corresponding thin film transistors. Each of the data signal lines is arranged between neighboring pixel regions in a direction perpendicular to the direction of the gate signal lines. A transparent pixel electrode 18 is positioned at an unit pixel region defined by two gate signal lines 12, 13 and a pair of data signal lines 16a, 16b. There is provided at least one projected portion for the unit pixel. A first thin film transistor 20 having three terminals of gate, source, and drain, is provided for switching the corresponding transparent electrode 18. The gate electrode (not shown) of the first thin film transistor 20 is connected with the corresponding gate signal line 12, a source electrode 20b connected with the corresponding data signal line 16a, and a drain electrode 20c connected with the transparent electrode 18. And, a channel layer 20a where carriers moves from the source electrode 20b to the drain one 20c, is provided in the first thin film transistor 20. A second thin film transistor 30 is provided for a transparent electrode (partially shown in FIG. 2) adjacent downwardly to the transparent electrode 18. The pixel electrode 18 is overlapped with the projected portion of the second gate signal line 13 corresponding to another unit pixel adjacent downwardly thereto, in order to form a storage capacitor together with a dielectric film(not shown) interposed therebetween. Although the portions 12a, 13a of the gate lines 12, 13 are outwardly projected with respect to respective corresponding pixel electrode in the first embodiment of FIG. 2, they may be formed such that they are projected inwardly or outwardly with respect to a corresponding pixel electrode as long as each gate signal line forms one storage capacitor in a unit pixel region. In further detail, when the projected portions 13a, 12a are outwardly projected with respect to their corresponding pixel electrodes, the projected portion 13a of the second gate signal line 13 is overlapped with the transparent pixel electrode 18 and the projected portion 12a of the first gate signal line 12 is overlapped with a transparent electrode(partially shown) that is upwardly adjacent to the transparent electrode 18. Meanwhile, in case that the gate signal lines 12, 13 have a structure projected inwardly with respect to respective corresponding pixel electrodes, the projected portion of the first gate signal line 12 is overlapped with the transparent pixel electrode 18 and the projected portion of the second gate signal line 13 is overlapped with a transparent electrode(partially shown) that is downwardly adjacent to the transparent electrode 18.

At reverse tilt regions A and B extending from both edge portions of the transparent electrode 18 to respective selected positions between the transparent electrode 18 and respective data signal lines adjacent thereto, there are respectively provided opaque electrodes 14a and 14b. At this time, an insulating layer(not shown) is interposed between the opaque electrodes 14a, 14b and the transparent pixel electrode 18. In order to electrically connect the opaque electordes 14a, 14b with the transparent pixel electrode 18, a long rectangular pillar of contact plug 22a, 22b are repectively formed in the insulating layer, whereby the opaque electrodes 14a, 14b maintains a same electric field as that of the pixel electrode 18. The contact plugs 22a, 22b are formed concurrently with the pixel electrode 18, are made of indium tin oxide which is the same material with the pixel electrode 18, and and are subordinate to the pixel electrode 18.

Figure 3:
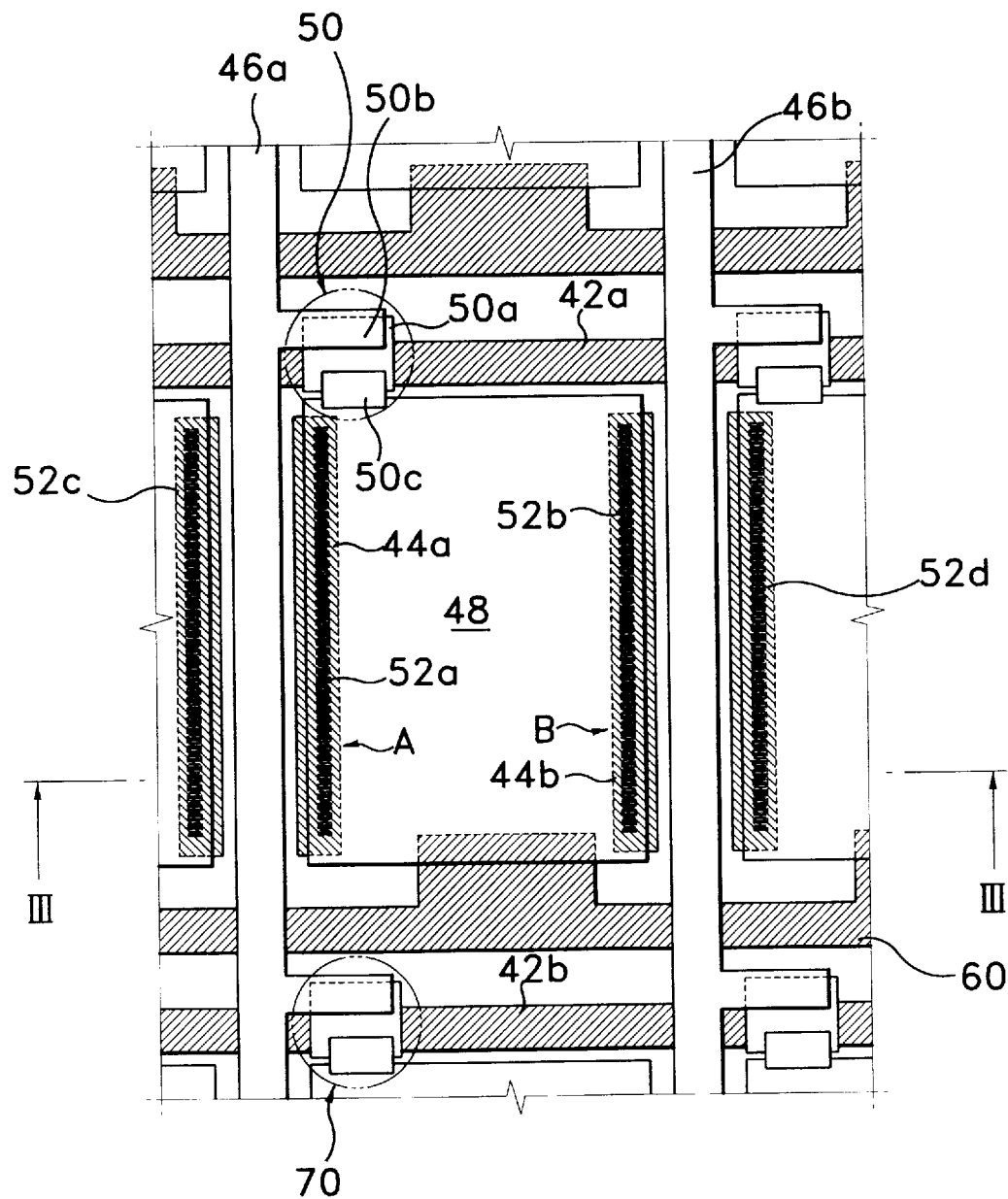
FIG. 3 is a plan view showing a unit pixel region of a TFT-LCD device in accordance with another embodiment of the present invention.

The above embodiment provides a plurality of gate signal lines, each of the plurality of gate signal lines having a plurality of projected portions, respective projected portions being overlapped with a corresponding pixel electrode, while, in another embodiment shown in FIG. 3, it is possible to provide a TFT-LCD devicd having a plurality of gate signal lines 42a, 42b, each of the plurality of gate signal lines not having the projected portions, each being parallel with another gate signal line. At this time, an additional electrode line 60 for storage capacitor(hereinbelow referred to as "storage electrode line") must be respectively provided within the unit pixel, so as to form storage capacitor together with the pixel electrode. The storage electrode line 60 can be positioned between a pixel electrode 48 and a gate line 42b adjacent thereto such that each projected portion of the storage electrode line 60 forms one storage capacitor with a corresponding pixel electrode. In case that the additional storage electrode line is provided, there should be provided an additional voltage source in order to supply driving signals to the storage electrode lines. In the first embodiment, the additional voltage source is not needed because the projected portions are partial portions of respective gate signal lines so that a driving voltage applied to a gate signal line is also used as a voltage source for supplying carriers to the projected portions of the gate line.

Meanwhile, since first and second thin film transistors 50, 70, opaque electrodes 44a, 44b, contact plugs 52a–52d, and pixel electrode 48 except the gate signal lines 42a, 42b and the storage electrode line 60 have the same structures and fuctions as those of the first embodiment, their descriptions are intentionally omitted.

Figure 4:
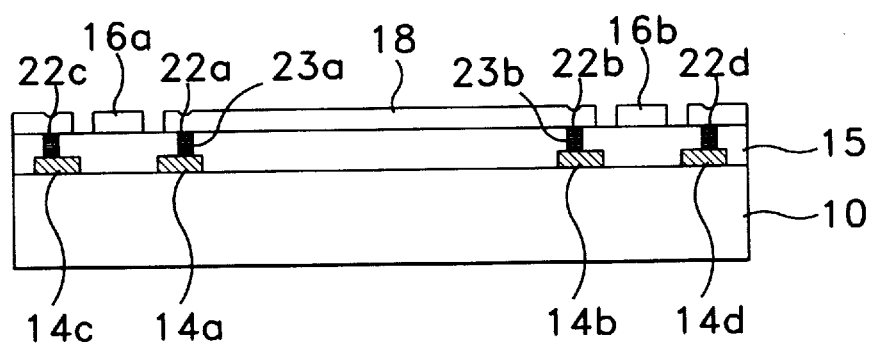
FIG. 4 is a sectional view taken along the line II—II of FIG. 2 and the line III—III of FIG. 3.

FIG. 4 is a sectional view taken along the line II—II of FIG. 2, which shows a same structure as that taken along the line III—III of FIG. 3. Accordingly, the sectional view of FIG. 3 and description are intentionally omitted.

Referring to FIG. 4, opaque electrodes 14a–14d are provided on a transparent glass substrate 10. The gate signal lines 12a, 12b shown in FIG. 2 and gate electrodes (not shown) are formed together when the opaque electrodes 14a–14d are formed. An insulating layer 15 is deposited on the transparent insulating substrate 10 including the opaque electrodes 14a–14d. A plurality of through holes 23a, 23b, two per one unit pixel, with a rectangular pillar shape are formed by etching selected portions of the insulating layer such that the underlying opaque electrode is exposed. It is possible to provide another shaped through holes as long as the holes have such a shape that make it easy to contact with the pixel electrode that is to be formed during the subsequent process. Thereafter, a channel layer(not shown) made of amorphous silicon for a thin film transistor is provided on the insulating layer. On the channel layer, there are selectively provided ion-doped semiconductor layers (not shown). Afterwards, data signal lines 16a, 16b are formed on the insulating layer 15. Thereafter, a pixel electrode 18 of indium tin oxide is formed on a selected portion of the dielectric layer 15 having the through holes 23a, 23b and simultaneously another pixel electrodes of indium tin oxide are formed on another selected portions of the dielectric layer 15 having the two corresonding through holes. During the formation of the pixel electrode 18, the indium tin oxide material is also filled in the holes 23a, 23b, to thereby form contact plugs 23a, 23b connecting the pixel electrode 18 with the underlying opaque electrodes 14a, 14b. The opaque electrodes 14a–14d are comprised of at least one material selected from a group consisting of chromium, tantalum, aluminum, molytantal(a compound of molybdenum and tantalium), and molytungsten(a compound of molybdenum and tungsten).

Since the opaque electrodes 14a, 14b receives a driving voltage through the pixel electrode 18 connected thereto, it maintains the same voltage as that of the pixel electrode 18. As a result, reverse tilt phenomenon is prevented.

In addition, since the opaque electrode also acts as a light-shielding plate shielding light that is incident from the outside into the reverse tilt region where the opaque electrodes 14a, 14b are positioned, a width occupied by a black matrix can decreases, whereby the aperture ratio per unit pixel increases. Moreover, since TFT-LCD device according to the present invention does not require a diode for applying a driving signal to the opaque electrode, a space by 10% and over occupied by the diode is not needed, so that the aperture ratio is enhanced. Furthermore, the invention can prevent yield drop caused by the formation of the diode.

Figure 5:
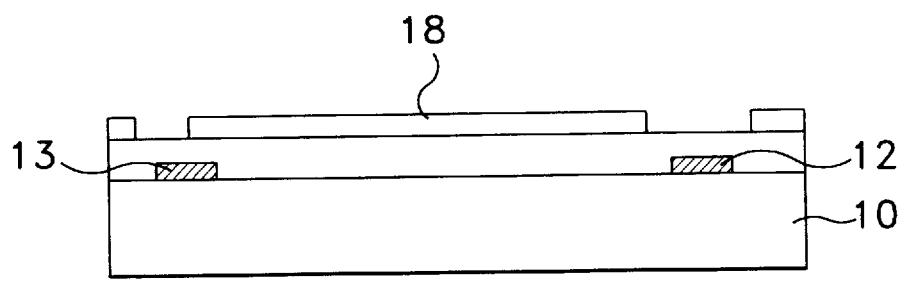
FIG. 5 is a sectional view taken along the line IV—IV of FIG. 2.

Meanwhile, FIG. 5 is a sectional view taken along the line IV—IV of FIG. 2.

Refering to FIGS. 2 and 5, the insulating layer 15 is interposed between the opaque electrodes 12, 13 and the pixel electrode 18, wherein the overlapped regions between the pixel electrode 18 and the opaque electrodes 14a, 14b function as storage capacitors.

While specific embodiments of the invention have been described in considerable detail, it is to be understood that variations and modifications of these embodiments can be effected without departing from the spirit and scope of the invention as described and claimed.

What is claimed is:
1. A liquid crystal display device comprising:
    a plurality of gate signal lines arranged in a direction on a transparent insulating substrate, being parallel to each other, spaced by a selected distance from each other, and each having a plurality of projected portions perpendicular to the lenth direction of the gate signal lines;
    an insulating layer formed on said transparent insulating substrate including the gate signal lines;
    a plurality of data signal lines arranged perpendicularly with the length direction of the gate signal lines, being parallel to each other, spaced by a selected distance from each other, and defining a plurality of unit pixel regions, each bounded by an intersection of a pair of the gate signal lines with a pair of the data signal lines;
    a plurality of thin film transistors corresponding respectively to the unit pixel regions, each of the transistors having a gate, a source and a drain electrodes, said gate electrode being connected with a corresponding one of the gate signal lines, and said source electrode being connected with a corresponding one of the data lines;
    a plurality of pixel electrodes formed on said insulating layer within respective unit pixel regions, each of the pixel electrodes being electrically connected with said drain electrode, and being overlapped with one of the projected portions of an adjacent one of the gate signal lines; and
    a plurality of opaque electrodes formed below said insulating layer, being arranged parallel to the data signal lines, each extending from both edge portions of each of the pixel electrode parallel to the data lines, to selected positions between said each pixel electrode and both data lines adjacent thereto, each electrically connected with said each pixel electrode through a contact plug formed in said insulating layer.
2. The device as claimed in claim 1, wherein said opaque electrode has a same voltage as that of said pixel electrode.
3. The device as claimed in claim 1, wherein said opaque electrode is comprised of at least one material selected from a group consisting of chromium, tantalum, aluminum, molytantal, and molytungsten.
4. The device as claimed in claim 1, wherein said each projected portion of the gate signal lines is projected such that said each projected portion is overlapped with any one of a pair of the pixel electrodes adjacent in the length direction of the data signal lines to a selected gate line of the gate signal lines.

5. The device as claimed in claim 1, wherein said projected portions of the gate lines are projected outwardly to a corresponding one of the unit pixel regions and is overlapped with the pixel electrode of another one of the unit pixel region adjacent thereto.

6. The device as claimed in claim 1, wherein said pixel electrode is of indium tin oxide.

7. The device as claimed in claim 1, wherein said contact plug has a rectangular pillar shape.

8. The device as claimed in claim 1, wherein said contact plug is a same material as that of said pixel electrode.

9. The device as claimed in claim 8, wherein said contact plug is of indium tin oxide.

10. A liquid crystal display device comprising:

a plurality of gate signal lines arranged on a transparent insulating substrate, being parallel to each other, and being spaced by a selected distance from each other;

an insulating layer formed on said transparent insulating substrate including the gate signal lines;

a plurality of data signal lines arranged in a direction perpendicular to the length direction of the gate signal lines, being parallel to each other, being spaced by a selected distance from each other, and difining a plurality of unit pixel regions, each bounded by an intersection of a pair of the gate signal lines with a pair of the data signal lines;

a plurality of thin film transistors corresponding respectively to the unit pixel regions, each of the transistors having a gate, a source and a drain electrodes, said gate electrode being connected with a corresponding one of the gate signal lines, and said source electrode being connected with a corresponding one of the data lines;

a plurality of pixel electrodes formed on said insulating layer, each of the pixel electrodes being electrically connected with said drain electrode;

a plurality of opaque electrodes formed below said insulating layer, being arranged parallel to the data signal lines, each extending from both edge portions of each of the pixel electrodes parallel to the data lines to selected positions between said each pixel electrode and both data lines adjacent thereto, each electrically connected with said each pixel electrode through a contact plug formed in said insulating layer; and a plurality of storage electrode lines formed on said insulating layer, each being arranged parallel to the gate signal lines between each of the pixel electrodes and any one of a pair of gate signal lines adjacent to said each pixel electrode, each having a plurality of projected portions projected inwardly with respect to respective corresponding pixel electrodes such that the projected portions are overlapped with respective corresponding pixel electrodes.

* * * * *

UNITED STATES PATENT AND TRADEMARK OFFICE
CERTIFICATE OF CORRECTION

PATENT NO : 5,844,641
DATED : December 1, 1998
INVENTOR(S): Jung-Mok Jun et al

It is certified that error appears in the above-identified patent and that said Letters Patent is hereby corrected as shown below:

At column 6, line 28 (claim 1, line 6), change "lenth" to --length--.

At column 6, line 51 (claim 1, line 29), after "extending", insert --,--.

At column 6, line 52 (claim 1, line 30), change "electrode" to --electrodes--.

At column 7, line 7 (claim 5, line 5), change "region" to --regions--.

At column 7, line 25 (claim 10, line 10), change "difining" to --defining--.

At column 8, line 12 (claim 10, line 25), after "extending", insert --,--.

At column 8, line 13 (claim 10, line 26), after "lines", insert --,--.

Signed and Sealed this

Thirtieth Day of March, 1999

Attest:

Q. TODD DICKINSON

*Attesting Officer*  *Acting Commissioner of Patents and Trademarks*